April 26, 1927.  1,626,412
J. V. JAMES
TUBE MAKING METHOD AND APPARATUS
Filed April 21, 1925  3 Sheets-Sheet 2
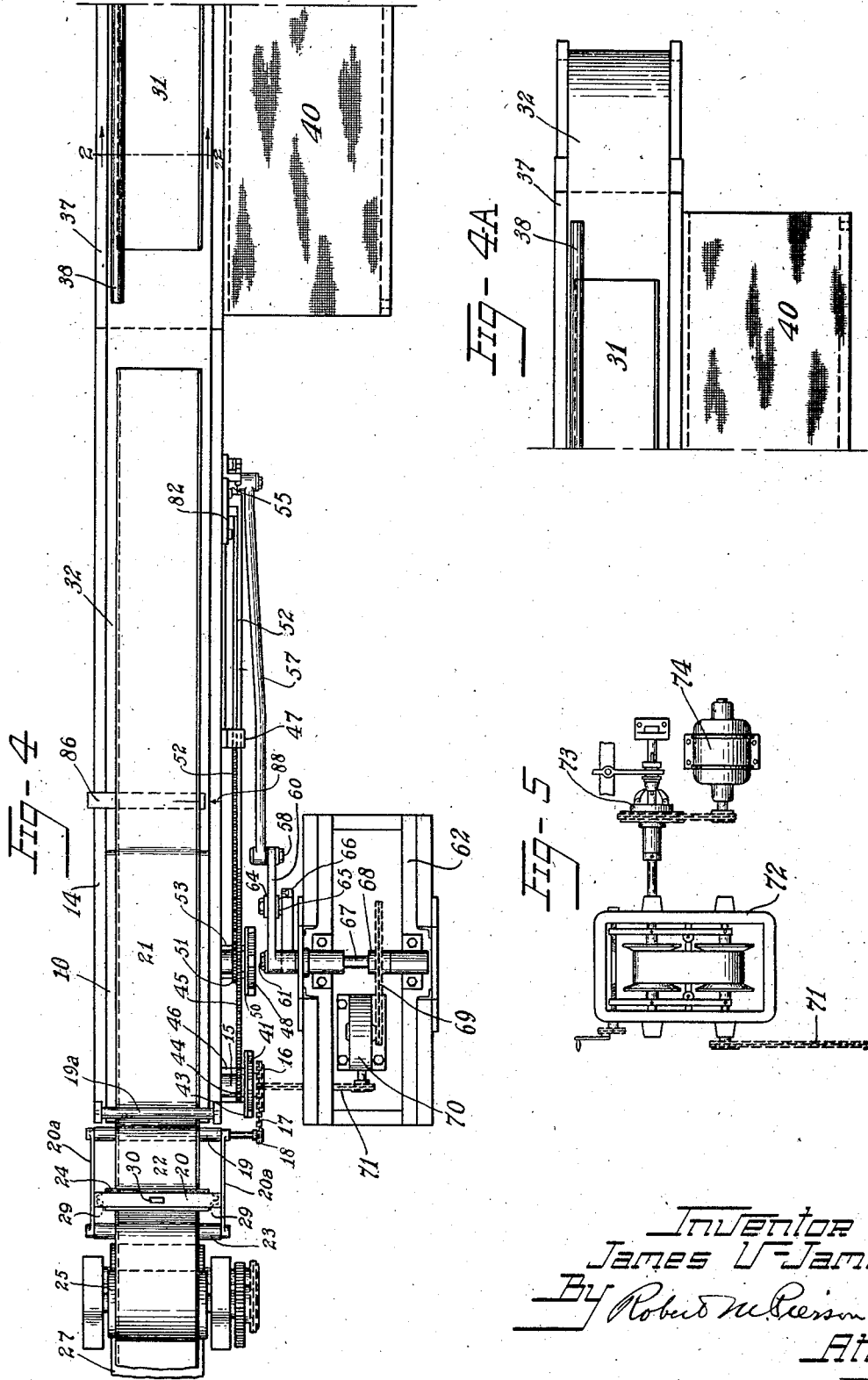
Inventor
James V. James
By Robert M. Pierson
Atty.

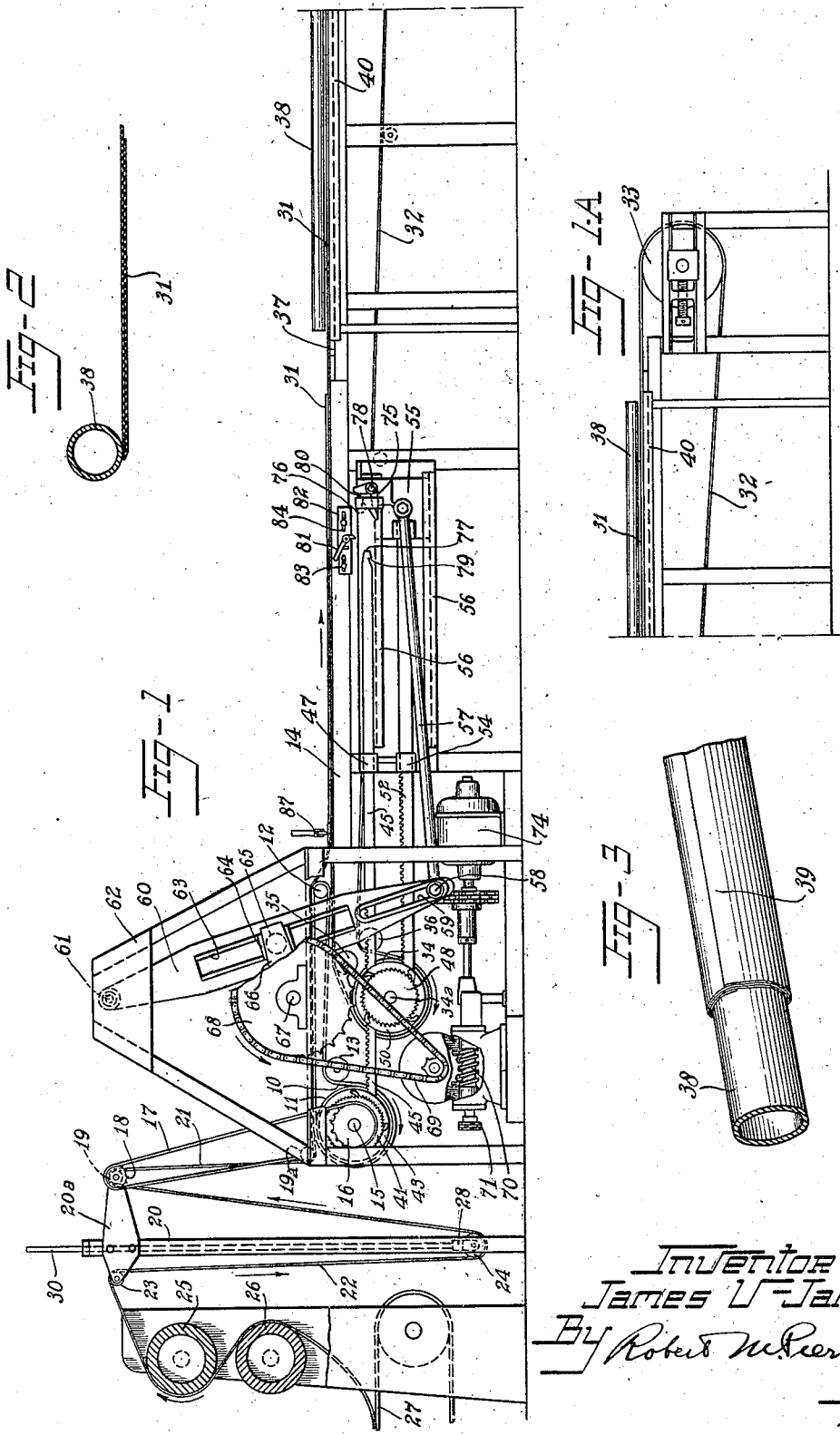

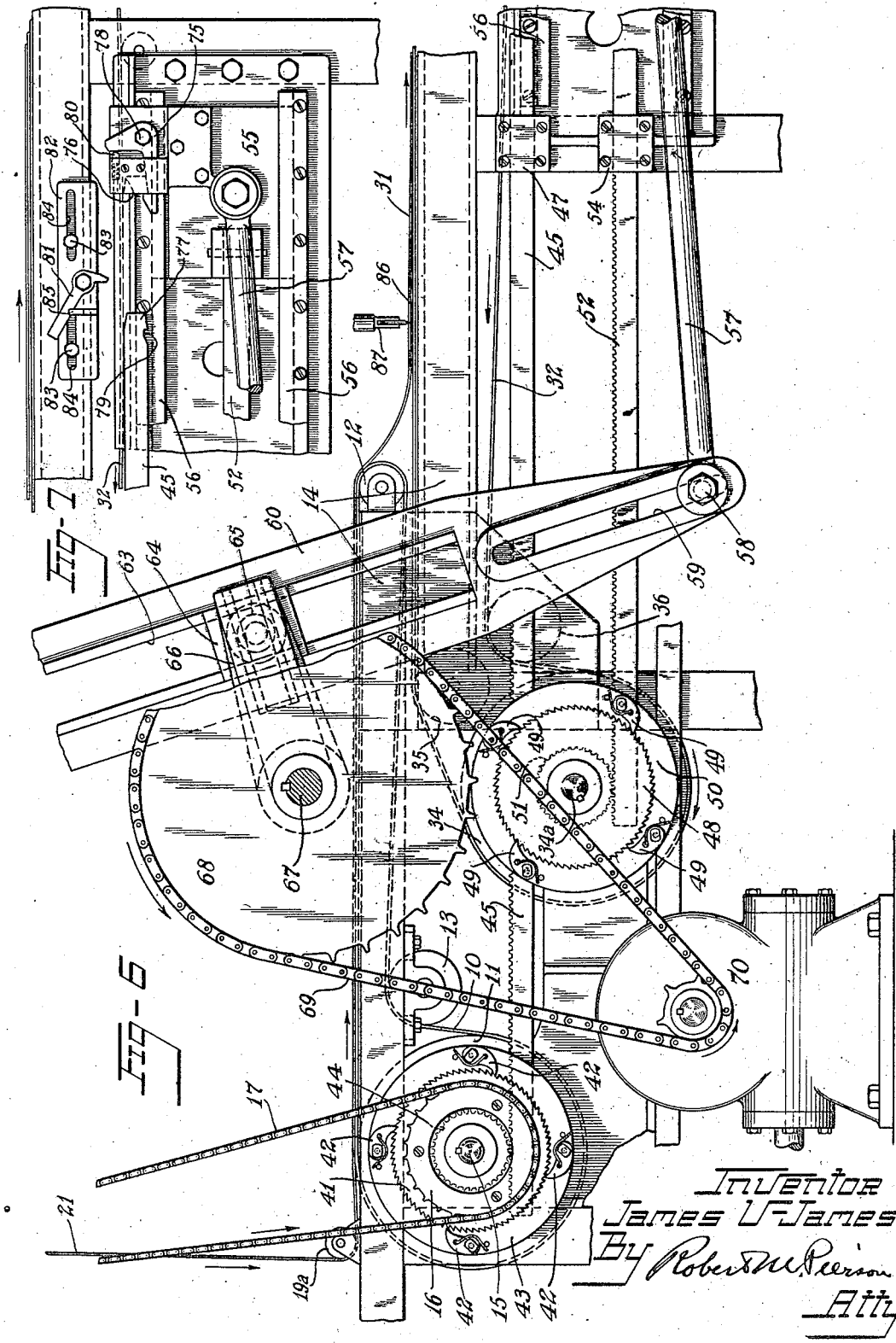

Patented Apr. 26, 1927.

1,626,412

UNITED STATES PATENT OFFICE.

JAMES V. JAMES, OF AKRON, OHIO, ASSIGNOR TO THE B. F. GOODRICH COMPANY, OF NEW YORK, N. Y., A CORPORATION OF NEW YORK.

TUBE-MAKING METHOD AND APPARATUS.

Application filed April 21, 1925. Serial No. 24,778.

This invention relates to methods and apparatus for manipulating strip material and more particularly to the making of articles such as inner tubes for pneumatic tires from tacky sheet rubber delivered in continuous strip form, as from a calendar.

Heretofore it has been proposed to feed a stock strip continuously from a calendar into a storage loop, to feed the stock from the delivery side of the storage loop in intermittent movements, and to sever the strip into tube blanks and to roll the blanks on successive mandrels between such feeding movements, but such practice as heretofore proposed has had the imperfection that in order to provide successive blanks in suitably spaced apart relation on their support, for rolling the mandrel thereon without contact of the mandrel with the next blank, it has been necessary to cut out and remove zones of stock between the successive blanks.

My chief object is to provide improved procedure and apparatus whereby the blanks may be severed from the continuous strip of stock and so fed forward from the severing position to a tube rolling position that each blank will be supported at the rolling position in spaced-apart relation to the next following blank, without requiring that zones of stock be cut out and removed from between adjacent blanks and without shifting the position of the blank with relation to the supporting surface upon which it lies. A more general object is to provide improved procedure and apparatus for manipulating strip material.

In the attainment of these objects my invention comprises an endless conveyor belt or the like adapted to convey the forward portion of the continuous strip past a severing position, in intermittent movements, and a second intermittently driven endless conveyor belt or the like adapted to step each severed blank ahead of the main body of the strip, so that each blank will be determinately spaced apart, on said second belt, from the following blank, the second belt being adapted to receive the successive blanks from the first belt and carry them to and support them at a determinate rolling position.

Of the accompanying drawings:

Figs. 1 and 1ᴀ together constitute a side elevation of the preferred apparatus embodying and adapted to carry out my invention, parts being broken away.

Fig. 2 is a section, on line 2—2 of Fig. 4 of one of the tube blanks and a mandrel in position to be rolled thereon.

Fig. 3 is a fragmentary perspective view of one of the mandrels with a tube rolled thereon.

Figs. 4 and 4ᴀ together constitute a plan view of the apparatus.

Fig. 5 is a plan view of drive mechanism constituting a part of the same.

Fig. 6 is a vertical section on a large scale, of a portion of the drive mechanism.

Fig. 7 is a side elevation, on a large scale, of timing means for determining the relative movements of the carrier belts.

Referring to the drawings, the apparatus comprises an endless carrier belt 10 mounted at its receiving end upon a large-diameter drive roll 11, at its delivery end upon a small-diameter idler end-roll 12, and passing about an idler guide roll 13 adjacent the drive roll 11, so that economy of space is effected by the proximity of the upper and lower reaches of the belt throughout the greater part of their length and at the same time effective driving engagement with the belt is provided by reason of the large diameter of the drive roll 11 and its engagement with the belt throughout the greater part of its circumference.

The said rolls are journaled in suitable framing 14 and the shaft, 15, of the drive roll 11, on which said roll is secured, also has secured thereon a sprocket 16 connected by a sprocket chain 17 with a sprocket 18 secured upon the shaft of a roll 19 which is journaled at an elevated position in brackets 20ᵃ, 20ᵃ secured upon an arch standard 20, the roll 19 being adapted to be intermittently driven, through the chain 17, to withdraw a continuous strip of sheeted rubber stock 21 from a storage loop 22 of said stock. Said storage loop is supported at its receiving side by an idler roll 23 journaled in the brackets 20, and is provided with a floating roll 24 for continuously drawing the strip into the storage loop, past cooling rolls 25, 26, from the delivery belt 27 of a calendar (not shown).

The floating roll 24 is journaled in the arms of a yoke 28, said arms slidably fitting in vertical guideways 29, 29 formed in the inner faces of the legs of the arch standard 20 as shown in Fig. 4, and the yoke is provided with a stem 30 slidably extending upward through a guide aperture formed in the top of the arch standard 20, the yoke and its stem thus having three point contact with the arch standard so that the floating roll is constrained to remain in a horizontal position and is prevented from cramping as it rises and falls with the shortening and the elongation of the storage loop.

A guide roll 19$^a$ is mounted adjacent the receiving end of the carrier belt 10 and adapted to compel the stock strip to move vertically downward from the roll 19 and then pass horizontally onto the belt, so as to prevent variation in the line of feed of the strip, as an incident of varying tension in the strip imposed by inertia of the rising and falling of the floating roll 24, and so as to assure proper area of driving engagement between the belt and the strip.

For receiving the successive blanks, 31, 31, from the intermittent carrier belt 10 and conveying them, in spaced-apart relation, to the tube-rolling position, an endless belt 32 has its receiving end portion under the delivery end of the belt 10 and extends in continuation of the work-carrying course thereof, said belt 32 being mounted, similarly to the belt 10, upon an idler delivery end-roll 33 (Fig. 1$^A$), a drive roll 34, and idler guide rolls 35, 36, journaled in the framing 14.

At the tube rolling position, adjacent the delivery end of the belt 32, the upper reach of said belt is slidably supported by a table 37 adapted to maintain the belt and the tube blank thereon in flat condition for the rolling of the mandrel, 38, upon the blank to wrap the latter about the mandrel as a tube, 39, thereon, and alongside of said table and connected therewith is a soapstoning apron 40 supported by its longitudinal margins only and adapted for the rolling of the mandrel-and-tube assembly thereover, as they pass from the belt 32, to apply soapstone, from a supply sprinkled upon the apron, to the exterior of the tube.

For intermittently driving the carrier belt 10 a ratchet 41 is secured upon the shaft 15 of the drive roll 11 and is adapted to be driven by spring pawls 42, 42 on a pawl carrier 43 loosely journaled upon said shaft as a twin with a pinion 44 meshed with a rack bar 45 slidably mounted in guide brackets 46, 47 projecting from the framing 14.

For intermittently driving the carrier belt 32 a ratchet 48 is secured upon the shaft 34$^a$ of the drive roll 34 and is adapted to be driven by spring pawls 49, 49 on a pawl carrier 50 loosely journaled on said shaft as a twin with a pinion 51 meshed with a rack bar 52 slidably mounted in guide brackets 53, 54 projecting from the framing 14. The forward end of said rack bar is secured to a slide or cross-head 55 mounted in guides 56, 56 secured to the framing, and for actuating said slide the same is provided with a connecting rod 57 having its other end pivoted on a crank-pin assembly 58 adjustably secured in a slot 59 formed in a lever 60 which has its upper end pivoted at 61 to the top of a drive-gear frame 62 mounted adjacent the framing 14. The middle portion of the lever 60 is formed with a longitudinal slot 63 in which is slidably mounted a crank-pin block 64 mounted upon a crank pin assembly 65 which is adjustably secured to a crank-arm 66 secured upon the projecting end of a shaft 67 journaled in the drive-gear frame 62.

For driving the shaft 67 a sprocket 68 secured thereon is connected, through a sprocket chain 69, a worm-gear speed reduction device 70, a sprocket chain 71, a variable speed drive device 72, and a clutch 73, with a motor 74.

For actuating the rack-bar 45 to drive the carrier belt 10 intermittently in timed relation to the intermittent driving of the carrier belt 32 by the rack-bar 52, the forward end of the rack-bar 45 is adapted to be engaged and released by the slide 55 and a latch 75 mounted thereon, at a determinate position in the path of said slide, so that in each reciprocation of the slide the belt 10 will not begin to be driven until after the belt 32 has started and, since the drive ratios of the two belt-driving mechanisms are the same, will not be driven throughout so extensive a movement as that of the belt 32.

The slide 55 is formed with a tapered socket 76 to receive and center the end 77 of the rack bar 45, which is complementally tapered. The latch 75 is formed as a bell-crank-lever and is pivoted on the slide at 78, one arm extending toward the rack-bar 45 and being formed as a cam-latch to engage in a notch 79 formed in said rack-bar, and the other arm extending vertically, being urged toward latching position by a spring-backed plunger 80 mounted in the slide, and being adapted to be thrown to unlatching position, at a determinate position in the forward, idle stroke of the slide, by a weight pawl 81 mounted upon a plate 82 which is adjustably secured to the framing 14 by bolts 83, 83 mounted in slots 84, 84 in said plate. A stop 85 projecting from the plate 82 is adapted to engage the weighted arm of the pawl 81 to hold the pawl in latch opening-position.

In the operation of the apparatus, the strip of stock 21, which may be composed of two laminations laterally offset, as shown in Fig. 2, is led about the rolls 26, 25, 23, 24, 19, and 19ª and onto the carrier belt 10, as shown clearly in Fig. 1. The motor 74, through the intermediate gearing described, continuously drives the shaft 67 and crank-arm 66, and the crank-pin block 64, sliding in the slot 63 of the lever 60 as the crank-arm revolves, imparts a continuously reciprocating motion to the slide 55 and the rack-bar 52 attached thereto, the carrier-belt 32 thereby being caused to be driven during the leftward stroke of the slide as viewed in the drawings, and being permitted to remain still, the pawls 49 running free on the ratchet 48, during the return or rightward stroke of the slide. The slide-actuating mechanism is of simple and economical construction and is such as to provide the necessary long movement of the slide with economy of space for the said mechanism.

Shortly after the carrier belt 32 starts each such movement, the slide 55 and latch 75 engage the rack-bar 45 and thus the slide drives the carrier belt 10 during the rest of its leftward stroke. In the return or rightward stroke of the slide, during which the carrier belt 10 stands still, the latch 75 returns the rack-bar 45 to its original position, where it is released by the action of the pawl 81 upon said latch.

In the first feeding movements of the two belts, which move at equal speeds, the stock strip is fed from belt 10 onto belt 32 and its leading end portion is carried forward by the latter. When the two belts stop, simultaneously, upon the beginning of the slides return or idle stroke, an operator severs the strip, as by the use of a cutting block 86 and cutter 87, at a severing position, which may be gaged by a mark 88 upon the framing, at a determinate, short distance from the delivery end of the belt 10. In the succeeding feeding movement of the belts, the belt 32 starting before the belt 10 starts, the severed blank 31 is stepped a determinate distance ahead of the main body of the strip, the end portion of the latter dragging upon the belt 32 until the belt 10 starts, and then being fed onto the belt 32 and carried forward thereby with its leading end determinately positioned thereon in spaced-apart relation to the preceding blank. The feeding and severing operations as described are continued, and this provides successive blanks determinately positioned upon the belt 32.

The length of the successive feeding movements and the proportions of the parts are so coordinated that the belt 32 stops with one blank after another supported upon the zone of the belt which rests upon the table 37, and while each blank is thus supported it is picked up on one of the mandrels 38, as a tube thereon, by rolling the mandrel upon the blank. The tube with the mandrel therein is then soapstoned by rolling it on the apron 40 and is then removed for vulcanization.

By means of the variable speed device 72 the speed of the carrier belts is so controlled as to accord with the speed of the delivery of the strip 21 from the calender and thus keep the floating roll 24 within a proper range of movement.

While a single unit of strip-manipulating mechanism is herein described, it will be obvious that my invention is not limited to a single strip-feeding unit for each calender and driving mechanism, calenders being usually of such width as to call for a duplication of parts herein described for utilizing the full capacity of the calender.

Modifications may be resorted to within the scope of my invention, and I do not wholly limit my claims to the specific procedure or construction described.

I claim:

1. The method of manipulating tacky sheet material in strip form which comprises feeding a continuous strip thereof onto a support while moving said support at substantially equal speed with the feeding movement of the material, severing from said continuous strip a length thereof lying upon said support, stepping forward the severed length to space it determinately from the rest of the strip by movement of said support, and so repeating the said operations as to deposit successive lengths of said material in determinate space-apart relation on said support.

2. A method as defined in claim 1 in which the feeding of the strip onto the support is intermittent and the successive severed lengths are carried to a determinate working position and there stopped by intermittent moving and stopping of the support in timed relation to the intermittent feeding of the strip onto the support.

3. The method of making rubber tubes which comprises feeding a strip of sheeted rubber stock to a tube-rolling position, severing it into blanks on its way to said tube-rolling position, the leading end portion of the strip being fed in intermittent movements timed with the severing operation and the severed blanks being fed in intermittent movements of such relative length and so timed as to step each severed blank ahead of the next and support it in spaced relation thereto at the rolling position, and there rolling the successive blanks upon mandrels in the form of tubes thereon.

4. The method of making rubber tubes which comprises continuously forming a strip of sheeted rubber stock, feeding it from forming position to a tube-rolling position, severing it into blanks on its way to said tube-rolling position, the severed blanks being stepped ahead of each other so that each arrives at the tube-rolling position in spaced apart relation to the next, and there rolling the successive blanks upon mandrels in the form of tubes thereon.

5. Strip-feeding apparatus comprising a conveyor adapted to feed longitudinally from its delivery end a strip of material, means for driving the same in intermittent movements, a second conveyor adapted to receive strip material fed longitudinally from the first conveyor, and means for driving the second conveyor in intermittent movements longer but of the same speed as the movements of the first conveyor.

6. Tube-making apparatus comprising means for supplying a continuous strip of sheeted rubber stock, means for feeding the strip from said means to a severing position, and means for feeding to a tube-rolling position successive blanks severed from the continuous strip at the severing position, the second feeding means being adapted to step each blank ahead of the next as it feeds the blank from the severing position and to support the blanks successively in position for the rolling of mandrels thereon.

7. Tube-making apparatus comprising a conveyor belt adapted to feed a continuous strip of material longitudinally from its delivery end, means for driving said belt in determinate, intermittent movements, a second conveyor belt adapted to receive the strip material from the first belt, and means for driving the second belt in intermittent movements of the same speed as those of the first belt but each so timed as to start before and continue concurrently with a movement of the first belt.

8. Tube-making apparatus as defined in claim 5 in which the driving means comprises rack-and-pinion devices for driving the respective conveyors and means common to the two racks for actuating the same, the said rack-actuating means being adapted to engage and disengage one of the racks at a determinate position in its stroke.

9. Tube-making apparatus as defined in claim 7 in which the driving means comprises rack-and-pinion devices for driving the respective conveyors, a slide for actuating the two racks, a connecting rod pivoted to said slide and to a lever, and a crank having its outer end connected to said lever and adapted to oscillate said lever at each revolution of the crank.

10. In an apparatus for making rubber tubes, two feeders adapted to feed a continuous sheet of compounded rubber material, said feeders being movable at the same time and at the same speed to advance an end portion of the sheet, cutting means whereby said end portion is severed from the sheet, and operating means whereby one of said feeders is actuated independently of the other to provide a space between the continuous sheet and the portion severed therefrom.

In witness whereof I have hereunto set my hand this 15th day of April, 1925.

JAMES V. JAMES.